United States Patent
Lin et al.

(10) Patent No.: US 8,089,693 B2
(45) Date of Patent: Jan. 3, 2012

(54) COLOR SEPARATION AND POLARIZATION DEVICE

(75) Inventors: Hui-Hsiung Lin, Hsinchu County (TW); Yu-Nan Pao, Hsinchu County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 415 days.

(21) Appl. No.: 12/340,856

(22) Filed: Dec. 22, 2008

(65) Prior Publication Data

US 2009/0161213 A1    Jun. 25, 2009

(30) Foreign Application Priority Data

Dec. 25, 2007  (TW) ............................ 96149859 A
Dec. 4, 2008  (TW) ............................ 97147098 A (51) Int. Cl.
*G02F 1/1335* (2006.01)
*G02B 27/28* (2006.01)

(52) U.S. Cl. ......... 359/491.01; 359/488.01; 359/489.14; 359/900; 349/57; 349/64; 349/95; 349/97; 349/106

(58) Field of Classification Search ............ 359/483.01, 359/488.01, 489.01, 489.07–489.09, 489.14, 359/491.01, 599, 609, 614, 618–621, 831; 349/57, 61–64, 95–97, 104, 106

See application file for complete search history.

(56) References Cited

U.S. PATENT DOCUMENTS

| | | | |
|---|---|---|---|
| 6,587,275 B2 * | 7/2003 | Lee et al. ................... | 359/620 |
| 6,867,828 B2 | 3/2005 | Taira et al. | |
| 6,952,310 B1 * | 10/2005 | Miyatake et al. ........ | 359/487.06 |
| 7,164,454 B2 | 1/2007 | Numata et al. | |
| 7,232,223 B2 * | 6/2007 | Koide ....................... | 353/20 |
| 7,321,464 B2 * | 1/2008 | Ouderkirk et al. ....... | 359/489.06 |
| 7,446,938 B2 * | 11/2008 | Miyatake et al. ......... | 359/489.2 |
| 7,633,679 B2 * | 12/2009 | Mi .......................... | 359/485.02 |
| 2002/0067547 A1 * | 6/2002 | Epstein et al. ............. | 359/606 |
| 2002/0089746 A1 * | 7/2002 | Akitaka ..................... | 359/487 |
| 2003/0137758 A1 * | 7/2003 | Ikeda ....................... | 359/883 |
| 2009/0016209 A1 * | 1/2009 | Ikeda et al. ................ | 369/284 |

FOREIGN PATENT DOCUMENTS

| | | |
|---|---|---|
| JP | 2005-062692 | 3/2005 |
| JP | 2006-220879 | 8/2006 |
| JP | 2007-334351 | 12/2007 |

OTHER PUBLICATIONS

Hui-Hsiung Lin and Mao-Hong Lu, Design of Hybrid Grating for Color Filter Appliation in Liquid Crystal Display, Japanese Journal of Applied Physics, vol. 46, No. 8B, 2007, pp. 5414-5418.

* cited by examiner

*Primary Examiner* — Frank Font
(74) *Attorney, Agent, or Firm* — WPAT., P.C.; Justin King (57) ABSTRACT

A color separation and polarization device is provided, which comprises a lens module, having a first frame including a polarization material received therein, and configured with a first light-entrance surface and a first light-emitting surface having a lens structure disposed thereon respectively, and a triangle-shaped optical structures, configured with a second light-entrance surface and a second light-emitting surface having triangle-shaped microstructures disposed thereon respectively. When a white light beam enters the first light-entrance surface, it is polarized by the polarization material, converged by the lens structure of the first light-emitting surface, splitting into a red beam, a green beam, and a blue beam by the triangle-shaped microstructures of the second light-entrance surface, and finally the three color beam are collimated by the triangle-shaped microstructures of the second light-emitting surface. By means of the device, light energy usage efficiency and light collimation and convergence are capable of being enhanced and improved.

12 Claims, 7 Drawing Sheets

COLOR SEPARATION AND POLARIZATION DEVICE

FIELD OF THE INVENTION

The present invention relates to a color separation and polarization device, and more particularly, to a device capable of utilizing a micro/nano-scaled structure, which is configured with a polarization material, for controlling color separation, polarization and aperture ratio.

BACKGROUND OF THE INVENTION

Generally, the structure of a common flat panel liquid crystal display (LCD) device includes a backlight module, a polarizer, a TFT liquid crystal display module, a color filter, an analyzer, and so on. Nevertheless, by the technology available today, the overall light energy usage of those conventional flat panel LCD devices can only achieve about 3-6% so that there is a very severe energy loss. In detail, it is the color filter that causes the most energy loss, in which there can be about 70% of light shining therethrough is wasted. In another word, the light efficiency of those conventional color filters is only about 30%. In addition, the waste caused by the polarizer can achieve as high as 60% which is another factor causing sever energy waste in conventional flat panel LCD devices.

Therefore, researchers all over the world are working tirelessly to come up with all kinds of new techniques for enhancing the LCD device's power saving efficiency effectively.

One such study is an optical element disclosed in U.S. Pat. No. 6,867,828, entitled "Light guide apparatus, a backlight apparatus and a liquid crystal display apparatus", and U.S. Pat. No. 7,164,454, entitles "Color filterless display device, optical element and manufacture", which is substantially a color separation element, being a micro-prism array of specific angle design or a micro-grating array, capable of separating and far-field diffracting a white light beam into a red, a green and a blue light beam. However, because of its complicity, the manufacturing process of the aforesaid optical element is so complex that not only its yield is poor, but also it has comparatively high cost. In addition, the resulting red, green and blue light beams are being discharged according to the diffraction angle of the optical element in a scattering manner and will keep scattering even when traveling in a display panel, causing flare and ghost image on the display panel, so that the aforesaid optical element is not performed well as it is applied in display panels. Moreover, the techniques in the aforesaid U.S. patents provide no way of enhancing aperture ratio and polarization efficiency.

Another such study is disclosed in a paper, entitled "Design of hybrid grating for color filter application in liquid crystal display", by Mr. Hui-Hsiunng Lin, at "The Joint Conference on Plastic Optical Fiber & Microoptics 2006", hosted by "Korea POF Communication Forum", in which a double-sided lenticular lens array having dual triangle-shaped microstructures formed thereon in a periodic manner is provided. The aforesaid double-sided lenticular lens array is able to collimate an incident while light for allowing the same to be separated into a red, a green and a blue light which are to be collimated thereafter, using which the shortcoming of conventional grating that it is restricted to operate on parallel incident light can be overcome, and also the poor sensitivity affected by the longitudinal and transverse errors caused in the optical element assembly is avoided.

Generally, a beam is composed of a vertical S-polarized beam and a horizontal P-polarized beam in fifty-fifty, according to which those conventional liquid crystal display devices usually has a polarizer to be disposed between its backlight module and liquid crystal display panel for allowing only one (S-polarized) of the two polarized beam to pass therethrough while absorbing the other (P-polarized). Thus, as the color separation grating design used in the aforesaid paper is adapted for common light beam that it did not take the polarization characteristic into consideration, the light loss ratio could be as high as 50%.

SUMMARY OF THE INVENTION

The object of the present invention is to provide a color separation and polarization device capable of utilizing a micro/nano-scaled structure, which is configured with a polarization material, for controlling color separation, polarization and aperture ratio in a manner that not only the collimation and scaling of light are enhanced, but also it can separate two polarized beams of different directions for allowing one of the two to pass its polarizer while reflecting, diffracting another one to be utilized by the color separation and polarization device so that the light energy usage efficiency can be greatly increased.

To achieve the above object, the present invention provides a color separation and polarization device, comprising: a lens module and an optical element with triangle-shaped structures, in which the lens module is substantially a first frame having a polarization material received therein, and configured with a first light-entrance surface and a first light-emitting surface. In an exemplary embodiment of the invention, the first light-entrance surface and the first light-emitting surface are respectively configured with a lens structure thereon; and the optical element with triangle-shaped structures is also configured with a second light-entrance surface and a second light-emitting surface, in that the second light-entrance surface and the second light-emitting surface are respectively configured with triangle-shaped microstructures.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
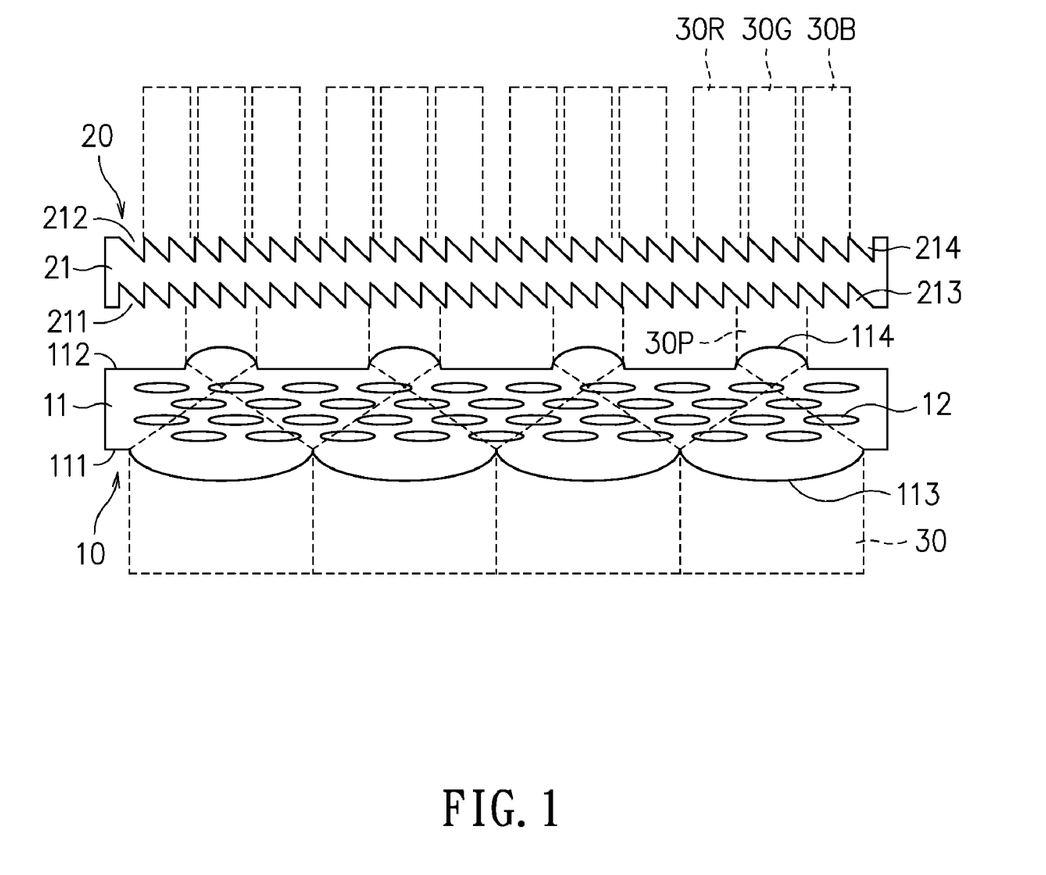
FIG. 1 is a sectional view of a color separation and polarization device according to an exemplary embodiment of the invention.

Please refer to FIG. 1, which is a sectional view of a color separation and polarization device according to an exemplary embodiment of the invention. The color separation and polarization device of FIG. 1 comprises a lens module 10 and an optical element 20 with triangle-shaped microstructures; in which the lens module 10 has a first frame 11, configured with a first light-entrance surface 111 and a first light-emitting surface 112 in a manner that each of the first light-entrance surface 111 and the first light-emitting surface 112 is fitted with lens structures arranged in a periodic manner. It is noted that each lens structure can be a cylindrical convex spherical lens, a cylindrical convex aspheric lens, a cylindrical concave spherical lens, or a cylindrical concave aspheric lens. However, in this exemplary embodiment, there are two types of plano-convex lenses 113, 114 being formed on the first light-entrance surface 111 and the first light-emitting surface 112 respectively, and the aperture of the plano-convex lens 113 formed on the first light-entrance surface 111 is larger than that of the plano-convex lens 114 formed on the first light-emitting surface 114.

Moreover, the first frame 11 is configured with a polarization material 12, whereas the first frame 11 can be made of an organic material, a glass, a metal, a silicon chip, or a composite semiconductor material; and the polarization material 12 can be a polymer-dispersed liquid crystal (PDLC), a cholesteric liquid crystal, a polyethylene 2,6-naphthalate (PEN), or the combination thereof. Furthermore, the polarization material 12 can be doped in the frame 11 so that it is integrally formed with the frame 11, or the polarization material 12 can be disposed on the surface of the frame 11.

The optical element 20 also has a second frame 21, which is structured with a second light-entrance surface 211 and a second light-emitting surface 212 in a manner that both are respectively configured with triangle-shaped microstructures 213, 214 thereon. In an exemplary embodiment, each of the triangle-shaped microstructures 213, 214 can be a two-dimensional pattern or a three-dimensional structure, In FIG. 1, the triangle-shaped microstructures 213, 214 are right-angled triangles that are arranged in a groove-to-groove manner. It is noted that each of the triangle-shaped microstructures 213, 214 can be a nano-scaled microstructure or a micro/nano-scaled microstructure that it is designed with respect to the wavelength of an incident light and thus the size of the microstructure to be formed on the optical element 20 is not specifically restricted.

As shown in FIG. 1, a white light beam 30, being a light radiating from a cold cathode fluorescent lamp (CCFL), a RGB light emitting diode (LED), or a RGB laser, enters the first frame 11 via the first light-entrance surface 111, in which it is polarized by a polarization material 12 received in the first frame 11 into a vertical S-polarized beam and a horizontal P-polarized beam. Thereafter, only the P-polarized beam is allowed to travel passing the lens module 10 while reflecting, or scattering the S-polarized beam so as to recycle the same for further usage and thus the light energy usage efficiency can be enhanced. Moreover, as the polarized white beam 30, i.e. the P-polarized beam, traveling passing the first light-emitting surface 112, it is scaled into a white light beam 30P with smaller diameter by the plano-convex lenses 114 of the lens module 10.

Thereafter, the white light beam 30P will enter the second light-entrance surface 211; and as soon as it is traveling passing the triangle-shaped microstructures 213 formed on the second light-entrance surface 211, the white light beam 30P is split into a red beam 30R, a green beam 30G and a blue beam 30B which are going to be collimated by the triangle-shaped microstructures 214 formed on the second light-emitting surface 212, i.e. they are guided to align with the incident direction of the original white light 30. After collimation, the three beams 30R, 30G and 30B will be emitted out of the optical element 20 through the second light-emitting surface 212.

Figure 2:
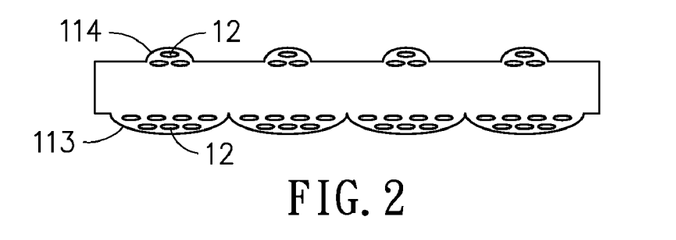
FIG. 2 to FIG. 6 are schematic diagrams showing various manners for forming a polarization material in a color separation and polarization device of the invention.
Figure 3:
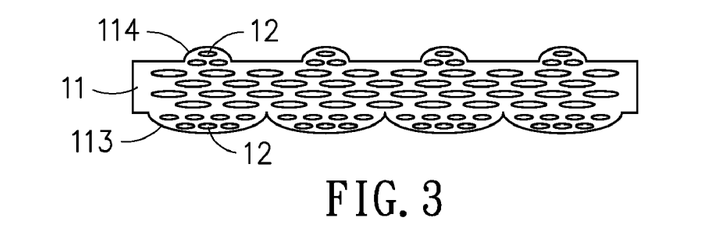
Figure 4:
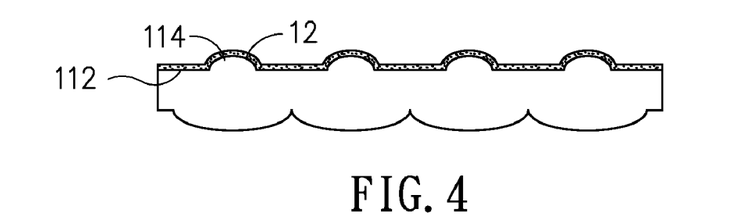
Figure 5:
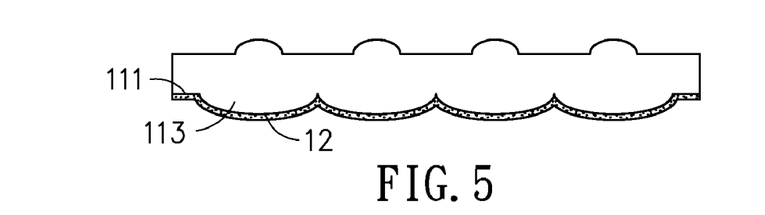
Figure 6:
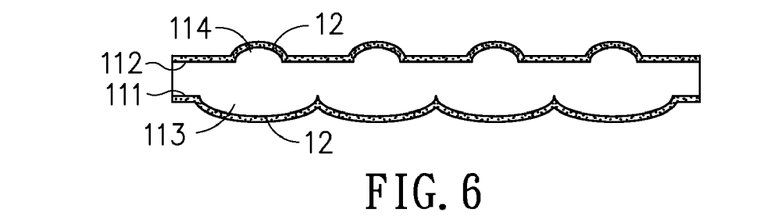

In FIG. 1, the polarization material 12 is disposed inside the first frame 11. However, there can be various manners for forming the polarization material 12 in the lens module 10, as those shown in FIG. 2 to FIG. 6. In FIG. 2, the polarization material 12 is doped inside the plano-convex lenses 113, 114 of the lens module 10. In FIG. 3, the polarization material 12 is doped not only inside the plano-convex lenses 113, 114, but also inside the first frame 11. In FIG. 4, the polarization material 12 is coated on the first light-emitting surface 112 and the surfaces of the plano-convex lenses 114. In FIG. 5, the polarization material 12 is coated on the first light-entrance surface 111 and the surfaces of the plano-convex lenses 113. In FIG. 6, the polarization material 12 is not only coated on the first light-emitting surface 112 and the surfaces of the plano-convex lenses 114, but also on the first light-entrance surface 111 and the surfaces of the plano-convex lenses 113.

Figure 7:
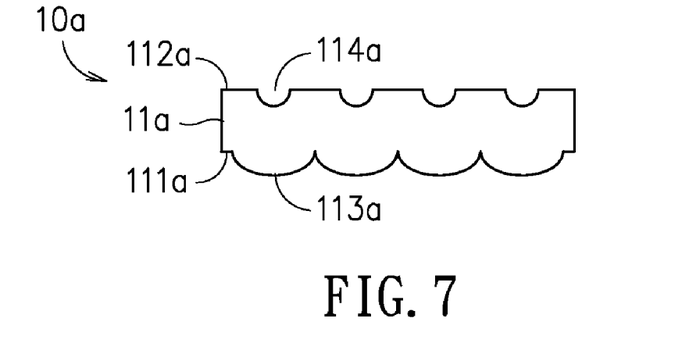
FIG. 7 to FIG. 9 are schematic diagrams showing various types of lens module capable of being adapted for a color separation and polarization device of the invention.
Figure 8:
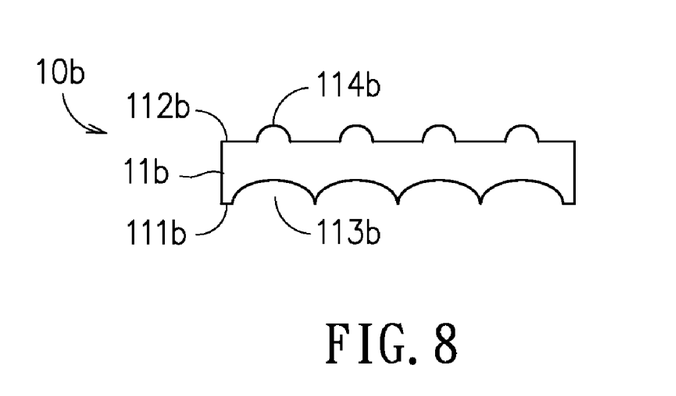
Figure 9:
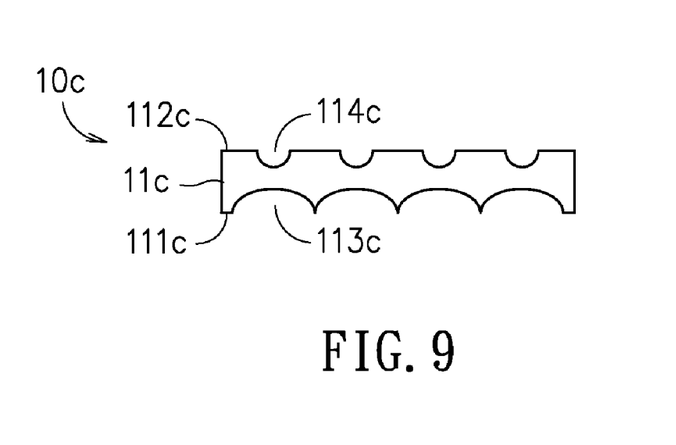

Please refer to FIG. 7 to FIG. 9, which are schematic diagrams showing various types of lens module capable of being adapted for a color separation and polarization device of the invention. In FIG. 7, the lens module 10a also has a first frame 11a, configured with a first light-entrance surface 111a and a first light-emitting surface 112a, but is characterized in that: there are plano-convex lenses 113a being disposed on the first light-entrance surface 111a and plano-concave lenses 114a being disposed on the first light-emitting surface 112a. In FIG. 8, the lens module 10b also has a first frame 11b, configured with a first light-entrance surface 111b and a first light-emitting surface 112b, but is characterized in that: there are plano-concave lenses 113b being disposed on the first light-entrance surface 111b and plano-convex lenses 114b being disposed on the first light-emitting surface 112b. In FIG. 9, the lens module 10c also has a first frame 11c, configured with a first light-entrance surface 111c and a first light-emitting surface 112c, but is characterized in that: there are plano-concave lenses 113c, 114c being disposed respectively on the first light-entrance surface 111c and the first light-emitting surface 112c. From the lens module 10, 10a, 10b, and 10c shown in FIG. 1, FIG. 7 to FIG. 9, it is concluded that despite of the lens module 10 is configured with plano-convex lenses or plano-concave lenses, the lens apertures of the lens structures formed on the first light-entrance surface must be larger than those formed on the first light-emitting surface so that the beam size of the light which traveling through the lens module can be scaled down. Moreover, it is important to design the lens module to have the polarization material, so that the P-polarized beam and the S-polarized beam can be separate for allowing only the P-polarized beam to pass while reflecting, scattering the S-polarized beam for preparing the same to be recycled and thus enhancing the light energy usage efficiency.

Figure 10:
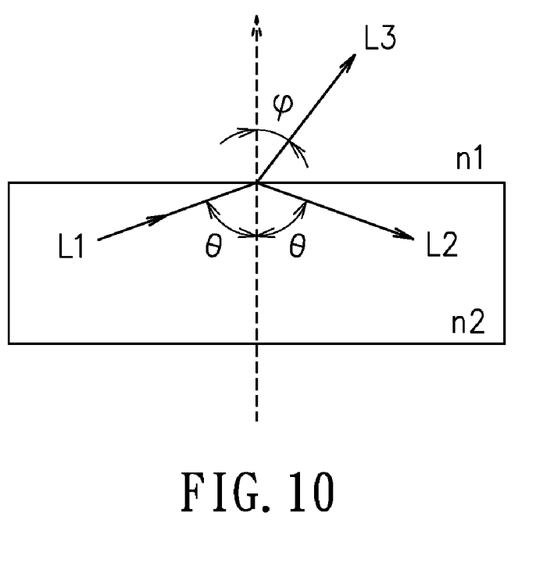
FIG. 10 is a schematic diagram showing the reflection and refraction of a S-polarized beam and a P-polarized beam as they are passing through an interface between two different media.

Please refer to FIG. 10, which is a schematic diagram showing the reflection and refraction of a S-polarized beam and a P-polarized beam as they are passing from a medium of refraction index n2 into another medium of refraction index n1. In FIG. 10, an incident beam L1 is project on the interface between the two media where it is reflected into a reflected beam by a reflection angle θ and refracted into a refracted beam by a refraction angle ϕ. According to electromagnetics theory, the continuity of the electric field as well as the magnetic field should be maintained at the interface. However, When an electric field and a magnetic field are present with arbitrary angles with the interface, the polarization direction of the S-polarized beam is different from that of the P-polarized beam which is going to cause the amplitude reflectances $r_s$, $r_p$ of the S-polarized and P-polarized beams to be different, and that also goes for the transmissions $t_s$, $t_p$ of the two. The amplitude reflectances $r_s$, $r_p$ and the transmissions $t_s$, $t_p$ can be represented according to the following formulas:

$$r_s = \frac{\cos\theta - \sqrt{\left(\frac{n_2}{n_1}\right)^2 - \sin^2\theta}}{\cos\theta + \sqrt{\left(\frac{n_2}{n_1}\right)^2 - \sin^2\theta}}$$

$$t_s = \frac{2\cos\theta}{\cos\theta + \sqrt{\left(\frac{n_2}{n_1}\right)^2 - \sin^2\theta}}$$

$$r_p = \frac{\left(\frac{n_2}{n_1}\right)^2 \cos\theta - \sqrt{\left(\frac{n_2}{n_1}\right)^2 - \sin^2\theta}}{\left(\frac{n_2}{n_1}\right)^2 \cos\theta + \sqrt{\left(\frac{n_2}{n_1}\right)^2 - \sin^2\theta}}$$

$$t_p = \frac{2\frac{n_2}{n_1}\cos\theta}{\left(\frac{n_2}{n_1}\right)^2 \cos\theta + \sqrt{\left(\frac{n_2}{n_1}\right)^2 - \sin^2\theta}}$$

From the above formulas, it is noted that the amplitude reflectances $r_s$, $r_p$ and the transmissions $t_s$, $t_p$ of the S-polarized and the P-polarized beams are functions of the incident angle θ and the refraction indexed n1 and n2.

Figure 11:
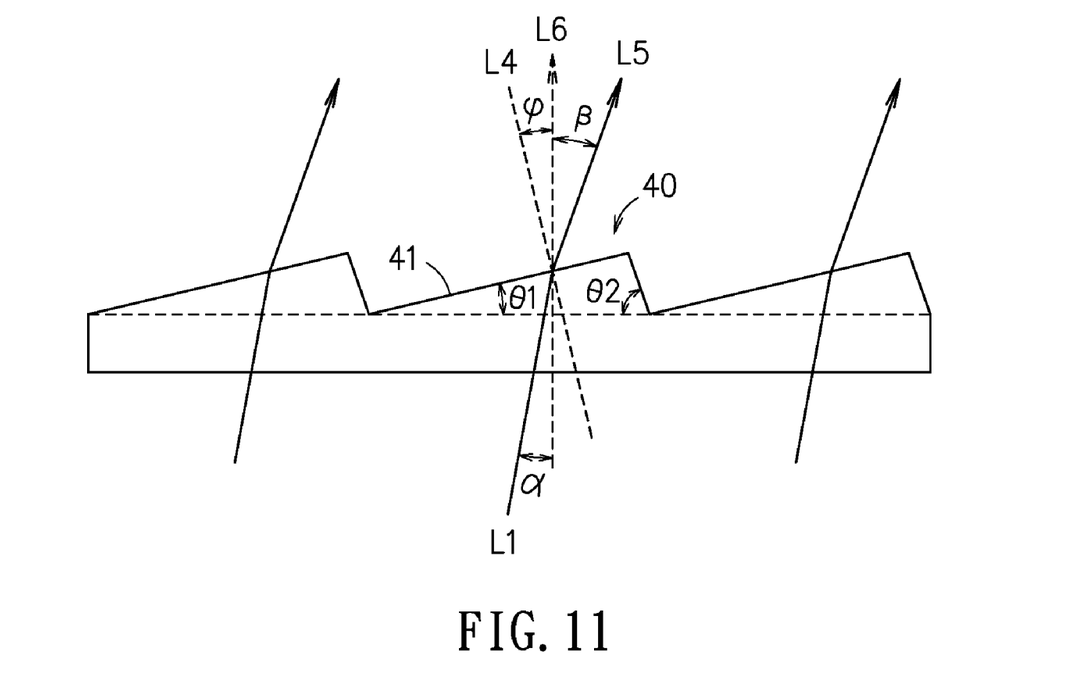
FIG. 11 shows the diffraction of a blazed grating.

Please refer to FIG. 11, which shows the diffraction of a blazed grating. The blazed grating is a grating with color separating and light diffracting abilities. By adjusting a relative angle included between the incident light L1 and the facet normal L4 of the grating 40, i.e. the angle α plus the angle ϕ for enabling the refraction beam L5 to be projected in a direction the same as the refraction of the facet 41 of the grating, thus the diffraction efficiency in the diffraction direction or in the refraction direction of the facet 41 as the one including an angle β between oneself and the grating's normal L6 is maximized.

If the incident beam L1 includes a P-polarized beam and a S-polarized beam, the amplitude and phase distribution of the light transmitting the interface will be affected by not only the included angle between the incident beam L1 and the interface, but also by the two refraction indexes n1 and n2. Hence, the shape as well as the angles, that is the angles θ1 and θ2 shown in FIG. 10, of the grating 40 must be fine tuned so as to maximize the diffraction efficiency in a specific diffraction direction or in the reflection direction of the facet 41.

Figure 12:
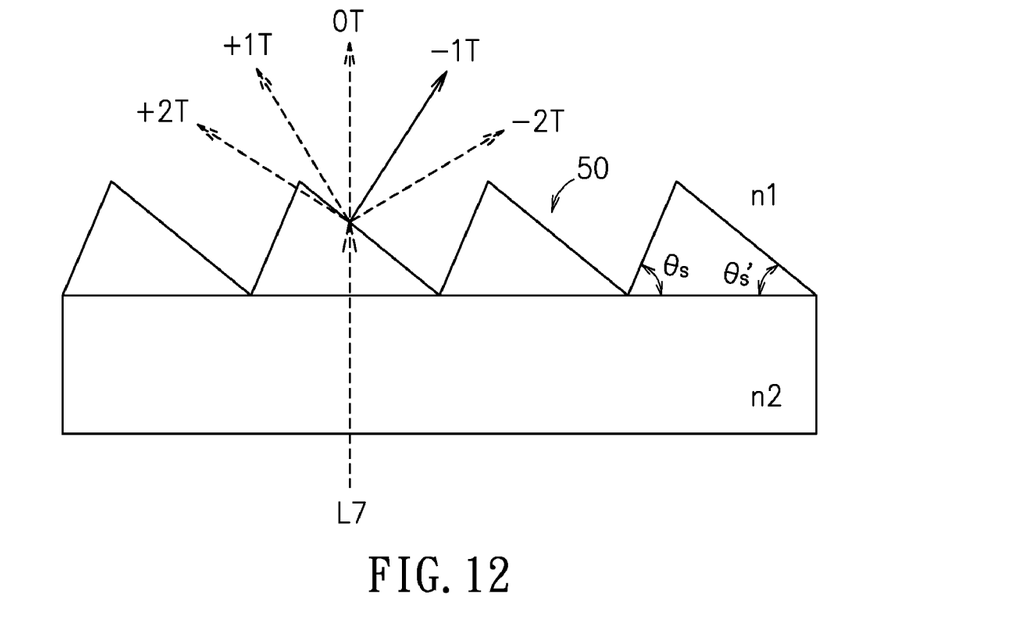
FIG. 12 is a schematic diagram showing the reflection and refraction of a S-polarized beam as it is passing through a triangle-shape micro-grating used in the present invention.
Figure 13:
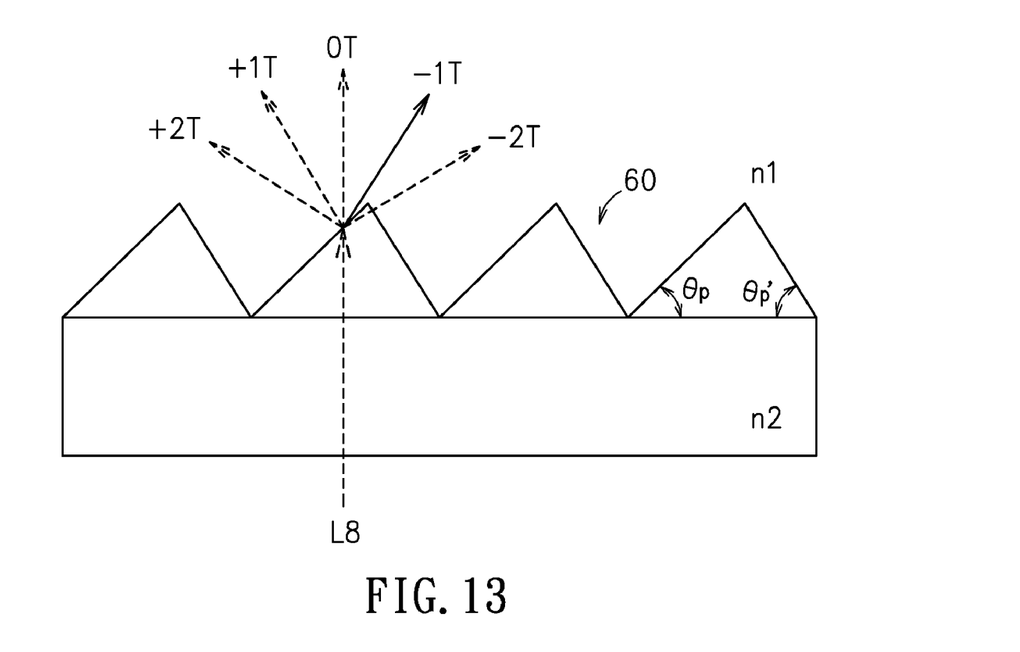
FIG. 13 is a schematic diagram showing the reflection and refraction of a P-polarized beam as it is passing through a triangle-shape micro-grating used in the present invention.

Please refer to FIG. 12 and FIG. 13, which are schematic diagrams showing the reflection and refraction of a S-polarized beam and a P-polarized beam as they are passing through a triangle-shape micro-grating used in the present invention. In FIG. 12, the incident beam L7 is a S-polarized beam and the micro-grating 50 is defined by the two base angles $θ_s$ and $θ_{s'}$. In FIG. 13, the incident beam L8 is a P-polarized beam and the micro-grating 60 is defined by the two base angles $θ_p$ and $θ_{p'}$. In FIG. 12 and FIG. 13, when the S-polarized beam L7 and the P-polarized beam L8 are traveling from a medium of refraction index n2 into another medium of refraction index n1 via the micro-gratings 50, 60, the amplitudes and the phase distributions of the resulting reflected beams as well as those of the transmission thereof will all be affected by the two refraction indexes n1, n2 and included the angles between the interface and the incident beam L7, L8. For improving the light efficiency with respect to a specific diffraction order as the −1 T diffraction order shown in FIG. 12 and FIG. 13, it can be achieved by the fine tuning of those base angles $θ_s$, $θ_{s'}$, $θ_p$ and $θ_{p'}$, of the micro-gratings 50, 60.

From the aforesaid principles relating to the separation and diffraction of the S-polarized and P-polarized beams, it is known that the optimum design of a light grating for a polarized beam is different from that for those non-polarized beams. As the device of the invention is designed for polarized beams, it is assured that the aforesaid light grating with triangle-shaped microstructures is one of the optimum designs for the present invention.

Figure 14:
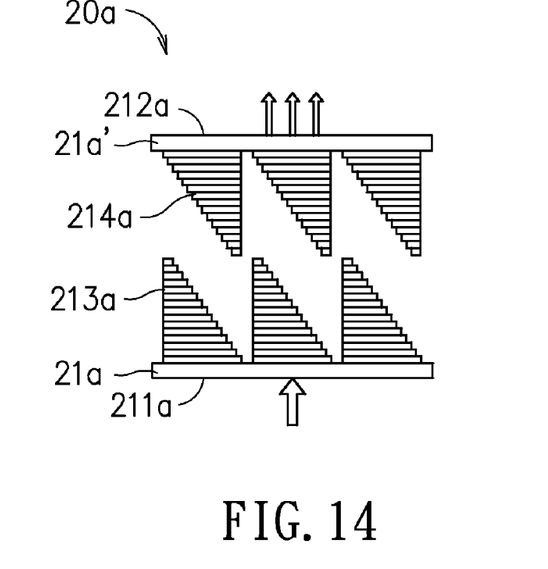
FIG. 14 to FIG. 17 are schematic diagrams showing respectively the optical elements with different triangle-shaped structures of the invention.
Figure 15:
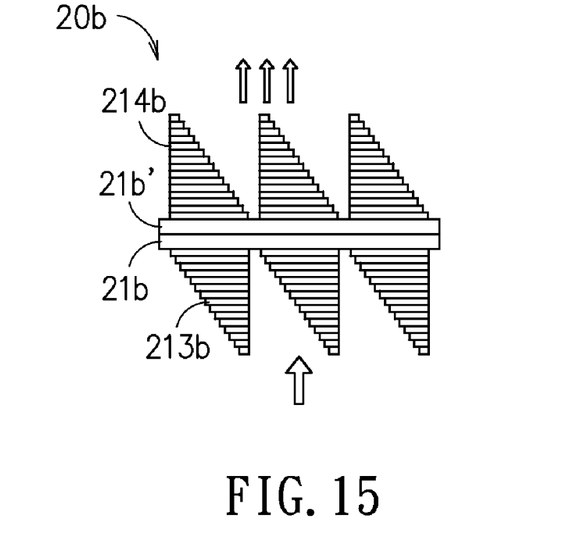
Figure 16:
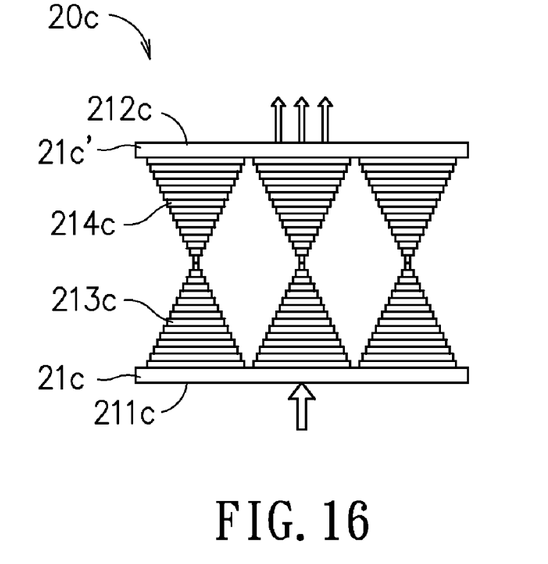
Figure 17:
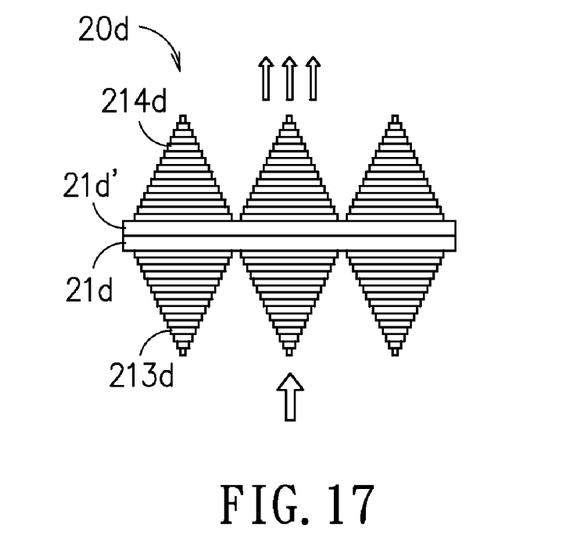

Please refer to FIG. 14 to FIG. 17, which are schematic diagrams showing respectively the optical elements with different triangle-shaped structures of the invention. In FIG. 14, the optical element 20a is characterized in that: it is configured with two substrates, referring as two second frames 21a, 21a', in which the second frame 21a is configured with a second light-entrance surface 211a and the second frame 21a' is configured with a second light-emitting surface 212a; and there are triangle-shape microstructures 213a and 214a being formed on the two second frames 21a, 21a' in respective in a groove-to-groove manner, whereas each triangle-shaped microstructure 213a, 214a is shaped like a right-angled triangle and is a multi-layered ladder-like structure. In FIG. 15, the optical element 20b is characterized in that: it is configured with two substrates, referring as two second frames 21b, 21b', in which there are triangle-shape microstructures 213b and 214b being formed on the two second frames 21b, 21b' in respective on the opposite surfaces thereof in a base-to-base manner, whereas each triangle-shaped microstructure 213b, 214b is shaped like a right-angled triangle and thus the surface of the second frame 21b formed with the triangle-shaped microstructures 213b is specified as a light-entrance surface while the surface of the second frame 21b' formed with the triangle-shaped microstructures 214b is specified as a light-emitting surface. In FIG. 16, the optical element 20c is structured similar to that shown in FIG. 14 and is configured with two substrates, referring as two second frames 21c, 21c', in which the second frame 21c is configured with a second light-entrance surface 211c and the second frame 21c' is configured with a second light-emitting surface 212c; and there are triangle-shape microstructures 213c and 214c being formed on the two second frames 21c, 21c' in respective in a groove-to-groove manner, but it is different from the one shown in FIG. 14 in that: each of the triangle-shaped microstructure 213c, 214c is an isosceles triangle. In FIG. 17, the optical element 20d is structured similar to that shown in FIG. 15 and is configured with two substrates, referring as two second frames 21d, 21d', in which the there are triangle-shape microstructures 213d and 214d being formed on the two second frames 21d, 21d' in respective on the opposite surfaces thereof in a base-to-base manner, whereas each triangle-shaped microstructure 213d, 214d is an isosceles triangle and thus the surface of the second frame 21d formed with the triangle-shaped microstructures 213d is specified as a light-entrance surface while the surface of the second frame 21d' formed with the triangle-shaped microstructures 214d is specified as a light-emitting surface.

From the optical elements 20, 20a, 20b, 20c and 20d shown in FIG. 1, FIG. 14~FIG. 17, it is noted that there can be various types of optical elements suitable to be adapted for the device of the invention. There can be the one with only one substrate as the one shown in FIG. 1, or the one with two substrates as those shown in FIG. 14 to FIG. 17. In addition, the triangle-shaped microstructures can be right-angled triangles as those shown in FIG. 1, FIG. 14 and FIG. 15, or can be isosceles triangles as those shown in FIG. 16 and FIG. 17. Moreover, the triangle-shape microstructures can be assembled in a groove-to-groove manner as those shown in FIG. 1, FIG. 14 and FIG. 16, or can be assembled in a base-to-base manner as those shown in FIG. 15 and FIG. 17.

As for the lens structure formed on the lens module and the triangle-shaped microstructures formed on the optical element, they are all being arranged in a periodic manner according to the following formula:

$$\theta = \sin^{-1}\frac{m\lambda}{p}$$

wherein
 $\theta$ is the diffraction angle;
 $\lambda$ is the wavelength;
 p is the period of the microstructure;
 m is the diffraction order, being an integer.
It is noted that all the above parameters $\theta$, $\lambda$, p and m are being specified according actual requirement and thus are not restricted.

Figure 18:
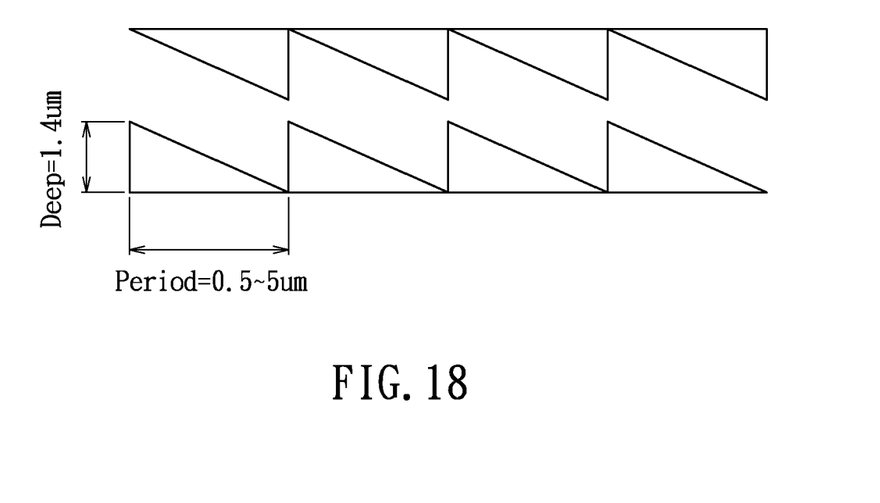
FIG. 18 is a schematic diagram showing triangle-shaped structures formed on in a groove-to-groove manner according to an embodiment of the invention.
Figure 19:
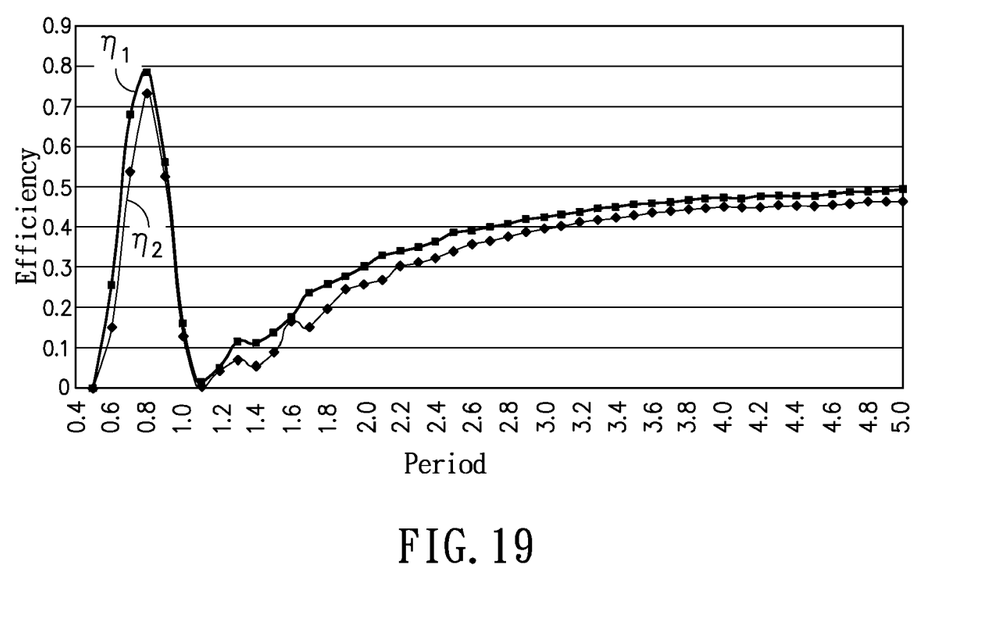
FIG. 19 is a profile showing an experimental diffraction efficiency obtained by the use of the optical elements of FIG. 18.

As shown in FIG. 18, the two triangle-shaped microstructures, each being formed in a periodic structure of period ranged between 0.5 um to 5 um, are formed in a groove-to-groove manner and the depth of each triangle-shaped microstructure is 1.4 um. When the optical element configured with the aforesaid triangle-shaped microstructures of FIG. 18 is illuminated by a polarized light and a non-polarized light, their diffraction efficiencies are depicted in the profile shown in FIG. 19. In FIG. 19, the curve $\eta_1$ represents the diffraction efficiency of the optical element when it is illuminated by the polarized light, and the curve $\eta_2$ represents the diffraction efficiency of the optical element when it is illuminated by the non-polarized light. It is noted that the optical diffraction efficiency is obtained when the period of the periodic triangle-shaped microstructure is 0.8 um, whereas the optimal diffraction efficiency for the polarized light is 78.193% and the optimal diffraction efficiency for the non-polarized light is 73.248%. From the above experiment, it is noted that when the lens module is doped with a polarization material for enabling the same to convert an incident light into a polarized light, correspondingly the optical element configured with triangle-shaped microstructure should be designed differently. Thus, while applying the aforesaid principle in a liquid crystal panel, not only the ratio of light being absorbed by the polarizer in the liquid crystal panel can be reduced, but also the efficiency of the optical element configured with triangle-shaped microstructure is increased.

To sum up, the color separation and polarization device of the invention is able to use a polarization material to separate a P-polarized beam from a S-polarized beam for allowing the S-polarized beam to be reflected and scattered so as to be recycled for further usage, and thus the light energy usage efficiency of the device can be enhanced. Moreover, by the lens module with periodic lens structures and the optical element with periodic triangle-shaped microstructures, the device of the invention is able to separate a beam into a red beam, a green beam and a blue beam for collimation. By the experimental verification, the angle error is within ±0.1 degree so that the shortcoming of conventional grating that it is restricted to operate on parallel incident light can be overcome, and also the poor sensitivity affected by the longitudinal and transverse errors caused in the optical element assembly is avoided. Thus, the color separation and polarization device of the invention can greatly improve the yield as well as light energy usage efficiency by at least 16% when it is applied in flat panel display apparatus and backlight module.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color separation and polarization device, comprising:
 a lens module, further comprising a first frame having a polarization material configured thereat, and the first frame being configured with a first light-entrance surface and a first light-emitting surface in a manner that both the first light-entrance surface and the first light-emitting surface are fitted with a respective lens structure; and
 an optical element, further comprising a second frame configured with a second light-entrance surface and a second light-emitting surface in a manner that both the second light-entrance surface and the second light emitting surface are fitted with a respective triangle-shaped microstructure;
 wherein, when a white light beam enters the first frame through the first light-entrance surface, the white light beam is polarized by the polarization material, converged by the lens structure configured on the first light-emitting surface, and is projected out of the first frame from the first light-emitting surface while being guided to enter the optical element through the second light-entrance surface where it is split into a red beam, a green beam, and a blue beam by the triangle-shaped microstructures configured on the second light-entrance surface of the optical element, and the red beam, green beam, and blue beam of light are collimated by the triangle-shaped microstructures configured on the second light-emitting surface and then emitted from the second light-emitting surface;
 wherein the two triangle-shaped microstructures are formed in a periodic structure of period ranged between 0.5 μm to 5 μm.

2. The device of claim 1, wherein the polarization material is a material selected from the group consisting of a polymer-dispersed liquid crystal (PDLC), a cholesteric liquid crystal, a polyethylene 2,6-naphthalate (PEN), and the combination thereof.

3. The device of claim 1, wherein the polarization material and the first frame are integrally formed.

4. The device of claim 1, wherein the lens structure is a lens selected from the group consisting of: a cylindrical convex spherical lens, a cylindrical convex aspheric lens, a cylindrical concave spherical lens, and a cylindrical concave aspheric lens.

5. The device of claim 4, wherein the lens aperture of the lens structure formed on the first light-entrance surface is larger than that formed on the first light-emitting surface.

6. The device of claim 1, wherein the first frame is made of a material selected from the group consisting of: an organic material, a glass, a metal, a silicon chip, and a composite semiconductor material.

7. The device of claim 1, wherein the triangle-shaped microstructures are formed on the optical element in a periodic manner.

8. The device of claim 1, wherein the polarization material can be doped in the first frame of the lens module or disposed on the surface of the first frame of the lens module.

9. The device of claim 1, wherein each triangle-shaped microstructure is in a geometrical shape selected from the group consisting of: an isosceles triangle and a right triangle.

10. The device of claim 1, wherein the second light-entrance surface and the second light-emitting surface are formed on the second frame of the optical element is a manner selected from the group consisting of: the second light-entrance surface and the second light-emitting surface are respectively being formed on the two opposite surfaces of a same substrate in the second frame, and the second light-entrance surface and the second light-emitting surface are respectively being formed on different substrates in the second frame.

11. The device of claim 1, wherein the triangle-shaped microstructures are formed in the optical element in a manner selected from the group consisting of: a groove-to-groove type formation and a base-to-base type formation.

12. The device of claim 1, wherein each triangle-shaped microstructure is a micro/nano-scaled microstructure.

\* \* \* \* \*